United States Patent
Moll et al.

[15] 3,673,888
[45] July 4, 1972

[54] AXLE HOUSING

[72] Inventors: Hans Heinrich Moll, Nusshaherstrasse 7; Otto Oeckl, Tifianstrasse 60, both of Munich, Germany

[22] Filed: July 23, 1970

[21] Appl. No.: 57,717

[30] Foreign Application Priority Data

July 23, 1969 Germany..................P 19 37 288.4
Aug. 28, 1969 Germany..................P 19 43 730.0

[52] U.S. Cl...........................................74/607, 301/124 H
[51] Int. Cl.................................................F16h 57/02
[58] Field of Search..................74/607; 29/463; 301/124 R, 301/124 H

[56] References Cited

UNITED STATES PATENTS

| | | | |
|---|---|---|---|
| 1,384,485 | 7/1921 | Putnam | 74/607 X |
| 1,613,592 | 1/1927 | Smith | 301/124 H |
| 1,643,225 | 9/1927 | Smith | 74/607 X |
| 1,991,199 | 2/1935 | Eisele | 301/124 H |

*Primary Examiner*—William F. O'Dea
*Assistant Examiner*—F. D. Shoemaker
*Attorney*—Francis D. Stephens and Hugo Huettig, Jr.

[57] ABSTRACT

An axle housing for a motor vehicle is composed of two half cylinders rolled from a flat plate of uniform thickness to varied thicknesses from one end to the other, and then die pressed to half cylinder shape and then welded together. This produces a low cost, lightweight housing having adequate strength in the load bearing areas.

1 Claim, 8 Drawing Figures

Fig. 1
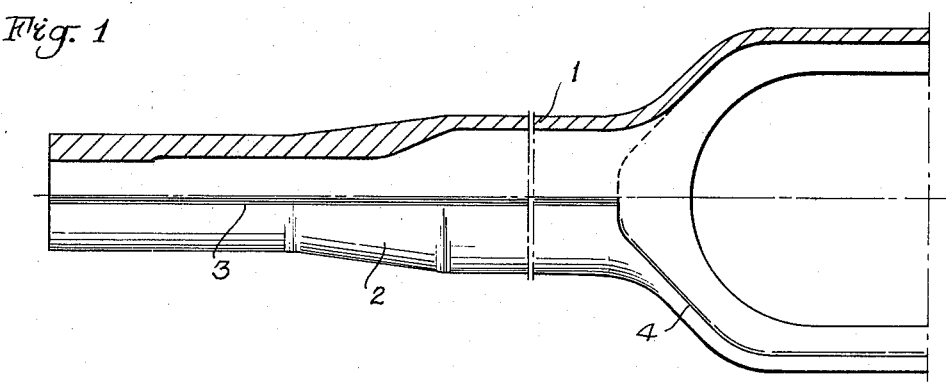
Fig. 2
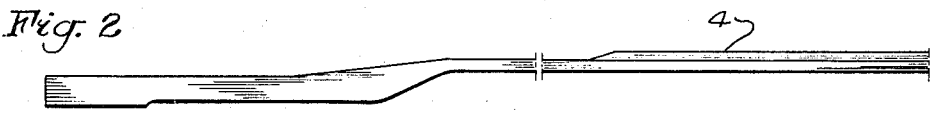
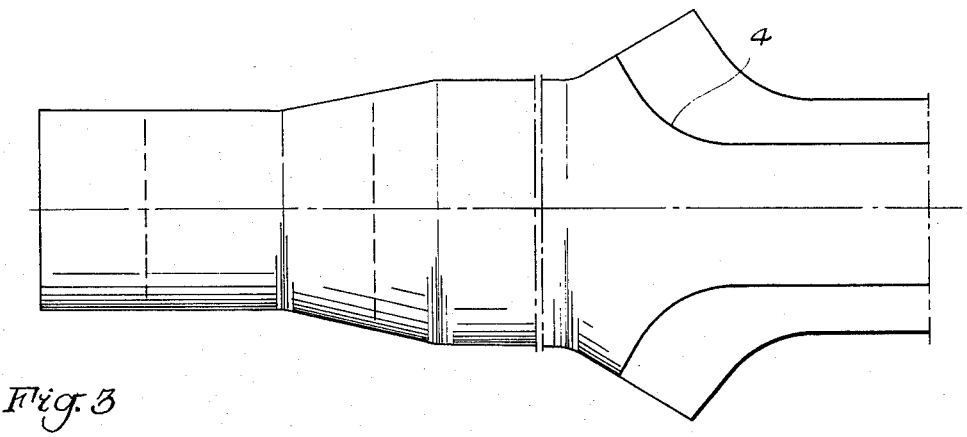
Fig. 3

INVENTORS
Hans Heinrich Moll
Otto Oeckl

AXLE HOUSING

This invention relates to an axle housing for motor vehicles, such as trucks, which is composed of two half cylinders that are formed from separate plates and are connected with each other in a horizontal plane by means of a welded seam.

This invention, in particular, is directed to rear axle housing.

Currently motor vehicle axle housings are, in general, cylindrical bodies which have a diameter and wall thickness that varies along the length of the housing. The housing is subjected to exceptionally heavy stresses at the end area between the axle spring and the wheel. In the cases where the wheel and spring are spaced from each other transversely of the vehicle, because the housing has to support the vehicle body through the spring, the housing itself is supported by the wheel riding on a roadway. Consequently, it is necessary that the housing be thicker in that area. For a drive axle, the housing is in addition subject to extra heavy stress in the center area if the axle drive housing is connected by flanges to the axle housing at that point.

Heretofore, to meet these conditions, the axle housing has been composed of several parts. The axle is transversely guided in its center, that is, in the longitudinal direction of the vehicle, and each half is formed in the manner of a cartridge shell and, after being forged, the halves are welded together. This method is extremely costly.

Another kind of housing is composed of two half cylinders produced from strips of sheet metal and hollowed out in the center in the form of rills and grooves and then welded together. The length of the halves of the cylinders corresponds to the length of the pin of the axle bearing and each half cylinder has a constant thickness throughout. The differential transmission end of the housing is, in this case, reinforced by a double layer of metal plate and reinforcing angles which means that its production cost is considerably increased. The stability characteristics of this type of housing are not optimum despite all precautions because the housing has not been reinforced within the spring support area.

The object of this invention is to avoid the above stated disadvantages and to produce an axle housing which can be formed with minimum cost and which has excellent stability characteristics.

In general, these objects are obtained by forming an axle housing of two half cylinders which have a wall thickness varying in thickness across the entire length of the housing. This is accomplished by working a flat plate of uniform thickness in a rolling process. In particular, the two housing halves are formed from flat metal sheets or so-called plate bars which, in order to produce the varying wall thickness and the semicylindrical shape, are first passed through counterrotating rollers to vary the thickness and then shaped by die pressing; in other words, they are curved around the longitudinal axis of the housing. The rolling of the flat plate produces a varied wall thickness at the ends of the plate bars as well as in the center of the workpiece in order to produce the cross-sections which are necessary for attaching the axle drive at a later time. Depending upon the size of the machine needed for working the flat material, it is possible that the plate bar extending over the entire width of the span of the axle housing consists of one piece or two identical pieces which are welded together in a jig before they are formed into semicylindrical shapes.

This invention is featured in that the axle housing can be simply and cheaply produced and has good stability characteristics.

In a further form of the invention, the wall thickness of each housing half is also varied transversely to the longitudinal length of the housing or across its width by means of a corresponding working of the flat workpiece.

The resistance against the main bending torque occurring in a vertical plane is increased by this feature, that is, the bending through the housing sections which connect on both sides of the vehicle center area. By working and forming the flat material which originally had a uniform thickness in the longitudinal and transverse directions of each half cylinder, it is therefor possible to increase the wall thickness and strength to an exceptionally high degree at those places most subject to stress so that this invention can produce an axle housing with the highest possible stability while keeping the entire weight low and holding the production costs low.

The means by which the objects of this invention are obtained are described more fully with references to the accompanying drawings in which:

FIG. 1 is a plan view of the axle housing of this invention with the top portion being shown in cross-section;

FIG. 2 is a side view of a plate which has been rolled to have a varying thickness throughout its length;

FIG. 3 is a plan view of FIG. 2;

As shown in FIG. 1, the axle housing is composed of two symmetrical half cylinders 1 and 2 which are welded together along the neutral axis. Since the welding seam 3 lies in the neutral axis of the axle housing, it is not necessary that the seam be either annealed or sandblasted after the half cylinders are welded together.

Flat metal blanks are the original material from which each half cylinder is formed. The forming is accomplished by working the blank between correspondingly profiled rollers. Each half of the axle housing is thus pre-formed out of flat shape. The pre-formed plate is then die pressed into semicircular form and thus has been bent around the longitudinal axis of the housing. The reinforced rib in the center portion of the housing for the attachment of the axle drive is also produced through the rolling process. It is also possible to produce each housing half by forming it from two separately worked plate bars which are then welded together, note FIG. 8.

The plate bar 1 in FIGS. 4 to 7 is achieved by rollers which work the blank in two different directions. The thickness of the shaped workpieces varies transversely of the workpiece. The lower face of the workpiece extends gradually so that a varying wall thickness is produced which extends along the length of the axle housing.

Figure 4:
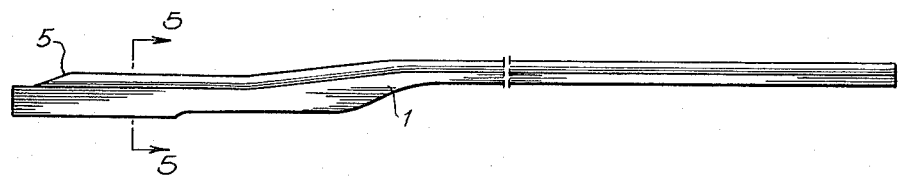
FIG. 4 is a side view of a plate which has been rolled of varying thickness both longitudinally and transversely.
Figure 5:
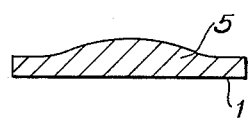
FIG. 5 is a cross-sectional view taken on the line 5—5 of FIG. 4.
Figure 6:
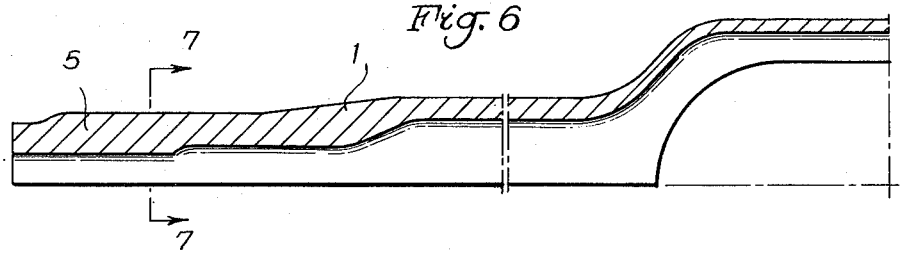
FIG. 6 is a cross-sectional view through a semi-cylindrical axle housing die pressed from the plate of FIG. 4.
Figure 7:
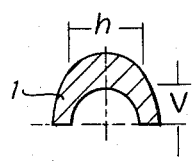
FIG. 7 is a cross-sectional view taken on the line 7—7 of FIG. 6.

As shown in FIG. 7, the wall thickness varies quite extensively transversely across the entire width of the axle housing. The semicircular profile in the horizontally extending area h has a wall strength that is thicker than it is in the vertically extending sections v. This feature considerably increases the resistance to bending stresses of the axle housing to a considerable extent.

Figure 8:
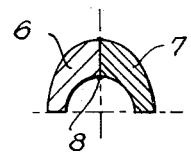
FIG. 8 is a modified form of FIG. 7.

As shown in FIG. 8, each semicylindrical housing half is formed of two separately shaped pieces 6 and 7, respectively, which are joined by a weld 8 before the pieces are die pressed into their semicylindrical shape.

Having now described the means by which the objects of the invention are obtained,

We claim:

1. An axle housing for a motor vehicle comprising two half cylinders welded together by longitudinally extending welding seams, each cylinder being varied in thickness both longitudinally and transversely from one end to the other, and with the lower face of each half cylinder extending gradually to produce a varying wall thickness in which the horizontal area ($h$) is thicker than the vertical sections ($v$).

* * * * *